[11] 3,596,047

[72] Inventors Daniel A. Maniero
Pittsburgh;
George A. Kemeny, Export, Pa.; Armin M. Bruning, Milwaukee, Wis.
[21] Appl. No. 801,502
[22] Filed Feb. 24, 1969
[45] Patented July 27, 1971
[73] Assignee Westinghouse Electric Corporation
Pittsburgh, Pa.
Division of Ser. No. 439,832, Mar. 15, 1965, abandoned, continuation of application Ser. No. 817,283, Apr. 15, 1969.

[54] METHOD FOR REMOVING DEFECTS FROM SLABS AND BLOOMS OF STEEL AND OTHER METALS
11 Claims, 10 Drawing Figs.
[52] U.S. Cl. .................................................. 219/123, 219/121
[51] Int. Cl. .................................................. B23k 9/08
[50] Field of Search ...................................... 219/69, 121, 121 P, 123

[56] References Cited
UNITED STATES PATENTS

| | | | |
|---|---|---|---|
| 2,125,172 | 7/1938 | Kinzel | 219/121 |
| 2,993,983 | 7/1961 | Carpenter et al. | 219/124 |
| 3,050,616 | 8/1962 | Gage | 219/121 |
| 3,146,336 | 8/1964 | Whitacre | 219/121 |
| 3,211,886 | 10/1965 | Barkan et al. | 219/121 |
| 3,336,460 | 8/1967 | Hauck et al. | 219/121 |
| 2,472,851 | 6/1949 | Landis et al. | 219/123 |
| 3,102,946 | 9/1963 | Fonberg | 219/123 |
| 3,248,514 | 4/1966 | Ramsey | 219/123 |

*Primary Examiner*—R. F. Staubly
*Assistant Examiner*—J. G. Smith
*Attorneys*—A. T. Stratton, C. L. McHale and M. I. Hull

ABSTRACT: One or more electric arcs take place from fluid-cooled arcing surfaces at fixed positions along the path of movement of a slab which is to have defects removed therefrom, and magnetic fields generated in the electrodes cause the arcs to move substantially continuously in repetitive paths over the arcing surfaces and over the surfaces of the slab. The repetition rate of movement of the arcs is sufficiently large and the rate of movement of the slab is sufficiently small whereby the arc spot occurs at substantially every point on the slab surface. Additionally, means is provided for quickly cooling successive portions of the surface of the slab after said portions have been heated by the electric arc or arcs. In some embodiments all surfaces of the slab are heated during linear movement of the slab in one direction; in another embodiment, two surfaces of a slab generally rectangular in cross section are heated while the slab moves in one direction, the slab is thereafter turned over and moved back in the opposite direction during which later movement the other two surfaces of the slab are heated.

PATENTED JUL 27 1971

INVENTORS
Daniel A. Maniero, George A. Kemeny
and Armin M. Bruning

Marry J. Hull
ATTORNEY 3,596,047

METHOD FOR REMOVING DEFECTS FROM SLABS AND BLOOMS OF STEEL AND OTHER METALS

This application is a division of copending application Ser. No. 439,832 filed Mar. 15, 1965, now abandoned, the invention of said application being described and claimed in a copending continuation application Ser. No. 817,283, filed Apr. 15, 1969.

This invention relates to improvements in a method of and apparatus for removing defects from slabs and blooms of metals such as steel, and more particularly to new and improved apparatus for heating the entire surface of a slab to a predetermined depth by electric arcs taking place to substantially 100 percent of the slab surface as the slab is moved substantially continuously in relation to the arcs, to thereby treat the entire surface of the slab and remove defects therefrom.

The method generally employed at present in steel mills to eliminate defects in a slab is a method known as hot scarfing. The hot scarfing method is used not only with slabs but with blooms of no particular shape. In the hot scarfing method, the flame from a multiple head torch is brought into contact with all of the surfaces of the slab. The torch uses a fuel gas and oxygen mixture; the surface temperature of the slab is raised to the point where rapid oxidation of the hot surface occurs in the presence of the oxygen stream. The slab is then moved past the torch and the heat generated by the exothermic oxidation reaction is sufficient to sustain the process without further use of the fuel gas. In the process as much as 0.05 inch of metal is removed from all surfaces of the slab with the oxides of iron being blown off the slab surfaces by the high gas exit velocities of the torch heads.

The hot-scarfing method is characterized by several disadvantages. One is that subsurface defects which are not removed during the scarfing must be later identified and burned out by manually operated scarfing torches prior to further working. Another is the considerable loss of metal which results from the scarfing operation. The metal removed up to 0.05 inch thick may correspond to a loss in mill output of as much as 1½ percent. In addition to the actual value of the metal lost, there are additional costs of carrying away the dross from the scarfing operation and returning it to the furnaces for remelting.

An additional disadvantage of the hot-scarfing method is that large quantities of oxygen are required in scarfing to burn away the surface. An oxygen-generating plane must be operated to supply this gas. The oxygen capacity of the equipment, production rate of the blooming mill, and the economic balance of metal loss and handling combine to limit the maximum thickness of metal which can be removed by hot scarfing.

Furthermore, slabs have surface or subsurface defects, as mentioned hereinbefore, which extend beyond the metal layer removed, which must be identified, and the slabs must be moved to an area where manual scarfing torches are used to remove the defects. The special handling of slabs with defects results in separation of slabs produced for a particular order and requires detailed record keeping and identification to assure that the slabs are included in the correct shipments.

Apparatus for practicing the method of the present invention makes use of arcs from a number of round or elliptical arc electrode heads belonging to nonconsumable water-cooled electrodes, the electrodes containing internal stirring coils for producing magnetic fields to substantially continuously move the arcs around the arcing surfaces of the electrodes. An electric arc takes place simultaneously between each electrode and the surface of the slab. The magnetic field produced by the coil rotates the arc on the electrode face and the arc is "dragged" along the slab surface. Heat generated in the slab by radiation from the arc, by resistance heating at the point of contact of the arc, and heat of convection of hot gases in the vicinity of the arc, results in melting the slab to a depth determined by the material of the slab, by arc current and speed of rotation, and slab temperature and speed of movement. Cracks and other defects in the slab surface are healed as the metal is melted by the arc and then cooled by spray from fluid manifolds. Solid and gaseous impurities are floated to the slab surface in the molten zone where they either escape to atmosphere or else are retained for a later removal. In one embodiment of apparatus for practicing the invention, during the surface heating and cooling oxidation of the surface is prevented by providing a reducing gas or inert gas atmosphere.

In further summary in one embodiment of apparatus for practicing the method of the invention a plurality of electrodes are disposed adjacent the upper surface of the slab, an additional plurality of electrodes are disposed adjacent the lower surface of the slab, with smaller numbers of electrodes disposed on each side of the slab so that the entire slab surface is heated as the slab moves along. Disposed near the arc electrodes are fluid spray devices for quickly cooling portions of the surface after movement of the slab has moved any heated portion away from the vicinity of the arc electrodes. In another embodiment, electrodes on the top and one side of the slab heat these surfaces as the slab moves in one direction, whereafter the slab is moved to a device for turning the slab over, and the slab is thereafter moved past the electrodes in the opposite direction whereupon the former bottom surface and the other side surface are heated, spray cooling devices being disposed on both sides of the electrode assembly.

Accordingly, one object of the invention is to provide a new and improved method for removing defects from slabs and blooms of steel and other metals.

Another object is to provide new and improved apparatus for removing defects from slabs and blooms of steel and other metals.

A further object is to provide new and improved apparatus employing nonconsumable arc electrodes for remelting the surface of a slab or bloom of steel or other metal to a predetermined depth to eliminate defects therefrom, and employing means to quickly cool the remelted surface to avoid oxidation thereof.

Still a further object is to provide new and improved bloom and slab remelt arc heater apparatus.

An additional object is to provide new and improved apparatus for heating the surface of a slab or bloom to a predetermined depth.

These and other objects will become more clearly apparent after a study of the following specification, when read in connection with the accompanying drawings, in which.

Figures 1, 8:
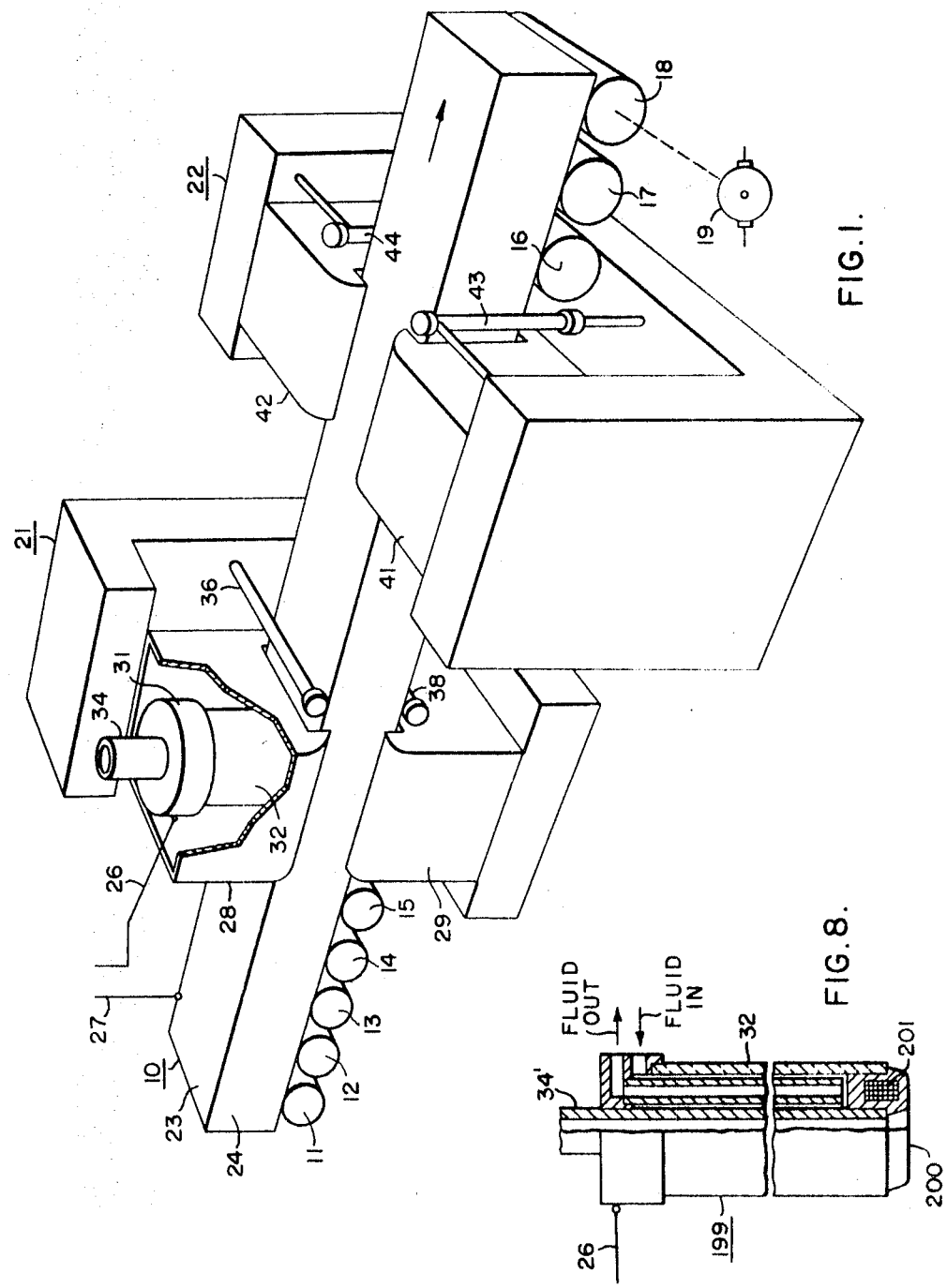
FIG. 1 is a view in perspective of apparatus for treating the top, bottom and both sides of the slab in a single movement and utilizing four large electrodes which may be generally cylindrical for heating each of the four surfaces of the slab.
Figure 2:
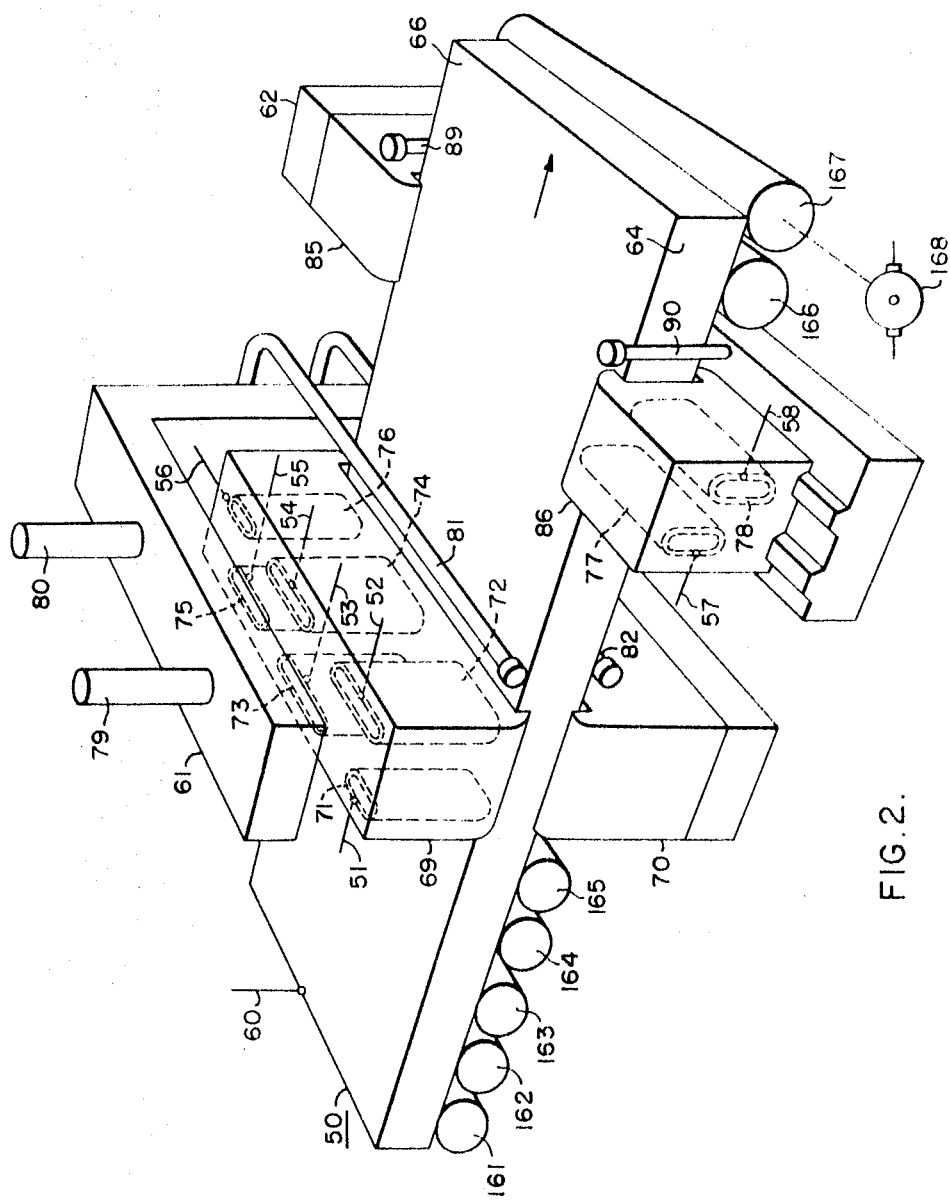
FIG. 2 is a view of a second and preferred embodiment of apparatus, in which a number of electrodes spaced in predetermined patterns are used for each surface of a wide slab during the slab remelt operation.
Figure 4:
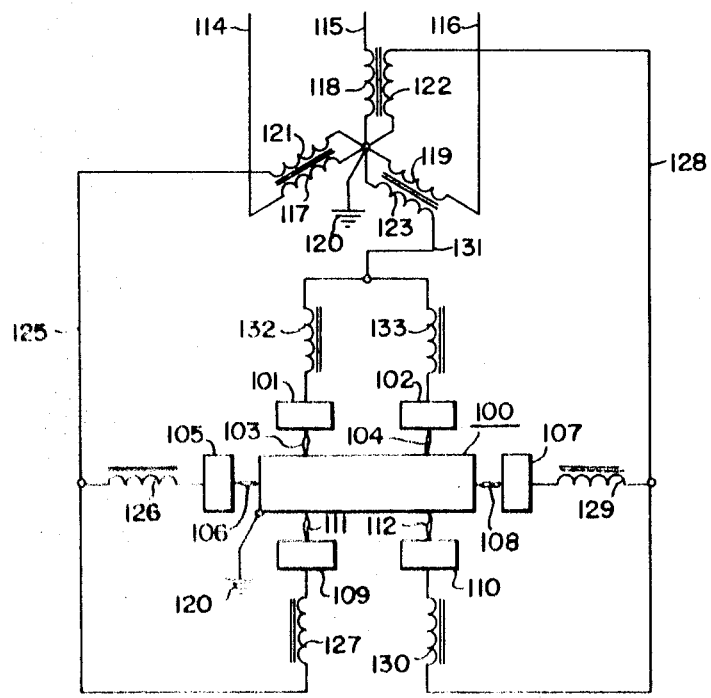
Figure 5A:
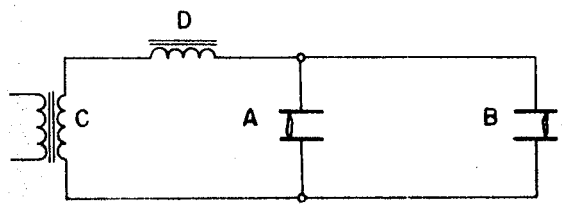
Figure 5B:
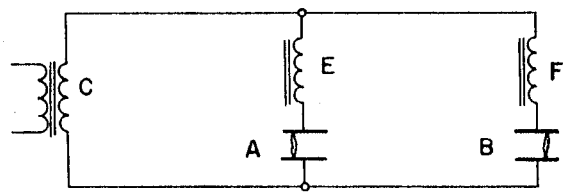
Figure 7:
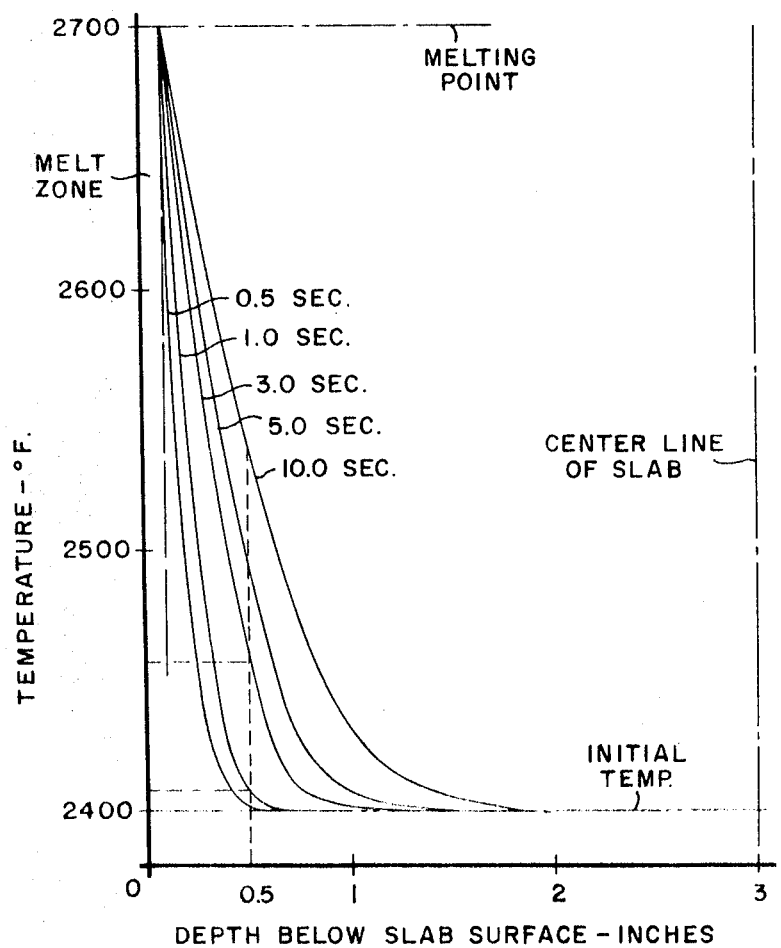
Figure 6:
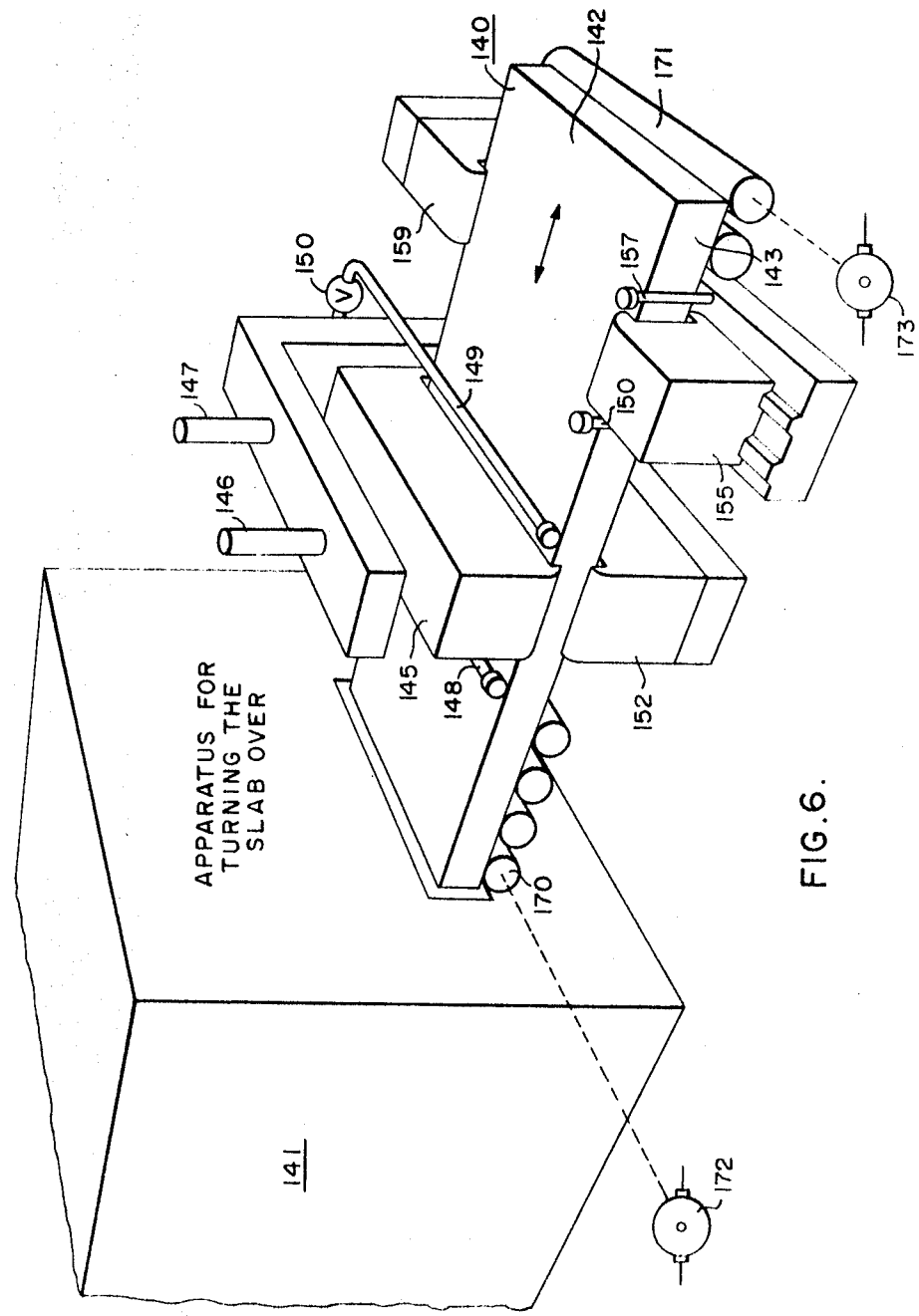

FIG. 4 is an electrical circuit diagram of a simplified version of the apparatus of FIG. 2, in which two electrodes with overlapping patterns of arc movement are used for the top of the slab, two similar electrodes with overlapping patterns of arc movement are used for the bottom of the slab, and one electrode is used for each side of the slab, all of these electrodes being fed from one three-phase high voltage transformer source;

FIGS. 5A and 5B are schematic electrical circuit diagrams illustrating the effect of an inductor or lack thereof in series with each pair of cooperating arc electrodes;

FIG. 6 is a perspective view of apparatus according to a fourth embodiment of the invention in which the steel slab is turned over to complete the process of heating all surfaces of the slab;

FIG. 7 is a graph illustrating the operation of the apparatus of FIGS. 1, 2 and 6; and FIG. 8 is an elevational view partially in section of a nonconsumable electrode.

Referring now to the drawings for a more detailed understanding of the invention, in which like reference numerals are used throughout to designate like parts, and in particular to FIG. 1 thereof, a slab to be heat treated is generally designated 10, is mounted upon rollers 11, 12, 13, 14 and 15 on the one hand, and 16, 17, and 18 on the other, having disposed therebetween two arc electrode assemblies or C-frames generally designated 21 and 22, the electrode assembly 21 being arranged for the purpose of heating the top 23 and bottom of the slab, and the electrode assembly 22 being constructed and arranged to heat the two sides of the slab, one of these sides being shown at 24. In accordance with conventional practice, motors may be disposed at spaced intervals along the path of travel of the slab 10 to apply turning forces to certain of the rollers, for example motor 19 and roller 18, certain other rollers or groups of rollers intermediate the driven rollers being journaled for free rotation while supporting the slab in its translatory movement.

The electrode assembly generally designated 21 is seen to include an upper housing, shroud or muffler 28 and a lower housing or shroud 29. Disposed within the upper shroud 28 there is seen an upper nonconsumable electrode 31. It will be understood that the lower housing or shroud 29 has a similar electrode, not shown, disposed therein. The electrode 31 is of the nonconsumable type, that is, it includes a water-cooled electrode face member with a coil disposed adjacent thereto or within the electrode, the coil being constructed and arranged to set up a magnetic field of sufficient magnitude transverse to the current path of the arc between the electrode and the slab to provide that the arc moves substantially continuously around the electrode face member at a predetermined speed, in accordance with the current through the arc and the construction including the dimensions of the electrode, so that substantially no sublimination of electrode material from the electrode face member occurs, and no burn through as a result of the intensely hot arc spot occurs.

The factors which must be considered in manufacturing and constructing a nonconsumable electrode which will withstand the most severe operating conditions, including very high current conditions of a substantially continual nature, arc reheating apparatus in the instant case, are set forth fully in the copending application of A. M. Bruning for "Electric Arc Furnace and Nonconsumable Electrode For Use Therein," Ser. No. 407,332, filed Oct. 29, 1964, and assigned to the assignee of the instant invention.

Disposed within the cylindrical electrode 31 and spaced therefrom is a pipe 34 for bringing an insert gas and exhausting the gas on the heated slab in the area of the arc. The gas brought in by pipe 34 may also be chosen to establish a reducing atmosphere at the heated slab. The slab 10 moves generally from left to right in the figure and accordingly there is provided a spray tube water manifold, or spray pipe 36 for spraying cold water or other fluid on successive areas of the hot surface of the slab substantially immediately after these areas of the surface of the slab move out from under the shroud. It will be understood that the pipe 36 has a plurality of spaced apertures along the length thereof so that cooling fluid may be substantially directly applied to all surface portions of the top 23 of the slab 10 along any given lateral path.

It will be understood that means symbolized by lead 26 is provided for bringing electrical current to the electrode 31; means is provided for connecting the terminal of opposite polarity of the source of the slab, symbolized by lead 27. In actual practice, certain rollers of conductive material may conduct current to the slab, the rollers having spaced teeth scattered over the surface thereof to bite into the slab and make good electrical contact. Also, spring biased roller electrodes on the side of the slab can be employed.

Means is also provided for bringing a cooling fluid to the electrode 31 and conducting fluid therefrom after the fluid has passed around the electrode face member and possibly other parts of the electrode to conduct heat therefrom. The tubular electrode supporting structure 32 may itself be at least partially conductive to conduct electric current to a conductive electrode face member.

Within the housing, shroud or muffler 29 beneath the slab 10, it will be understood that there is disposed an energized electric arc electrode which may be substantially similar to electrode 31, and which may have a pipe corresponding to the pipe 34 for bringing an inert or reducing gas to the area of the slab surface the arc impinges on. The lower shroud 29 has the fluid pipe or manifold 38 disposed in a manner to spray a cooling fluid on the bottom of the slab as the slab passes by.

Spaced a predetermined distance from the electrode assembly 21, depending upon the speed of the travel of the slab 10 and other factors such as the temperature of the slab, the material thereof, and the depth to which the slab is to be heated, is the second aforementioned electrode assembly 22 mounted on a C-frame and having shrouds 41 and 42 each containing an electrode, not shown, having a diameter at least as great as the height of a side of the slab, which it is understood are suitably connected to a source of potential to produce arcs to the slab 10; the electrodes of shrouds 41 and 42 also contain a pipe or pipes, not shown, for bringing an inert or reducing gas to the area of the arc and releasing it. Disposed adjacent the exit side of the shroud 41 is a spray pipe or manifold 43; disposed adjacent the exit side of shroud 42 is a spray pipe or manifold 44, for spraying the two sides of the slab to quickly cool successive areas of the same after the areas have passed through the heating areas of the arc electrodes in shrouds 41 and 42.

In the operation of the apparatus of FIG. 1, as previously stated an electric arc is struck between each electrode and the surface of the slab. In FIG. 1 the slab is assumed to be of a relatively small width and a relatively small height. For example, the dimensions of a bloom or slab frequently encountered in practice is 7¼ inches by 8¾ inches. Assuming for the purpose of discussion that the top of the slab is 8¾ inches in width, then the diameter of the arcing surface of the electrode 31 would be made approximately 8¾ inches in width, or slightly over, so that the arc traveling around the arcing surface in response to the aforementioned magnetic field continuously moves back and forth across the entire upper surface of the slab. It will be apparent that even though the slab may be moving a speed of several inches per second, the arc of the electrode 31 may be made to rotate at a speed of, for example, 3,000 revolutions per second, this being a speed which is easily obtained in practice, so that assuming that the slab moves 3 inches per second and the arc moves 3,000 revolutions per second it will be seen that the arc will traverse the slab approximately 2,000 times per inch, or will make approximately 1,000 return trips across the slab per inch, so that for all practical purposes every spot on the slab comes in direct contact with the arc from electrode 31. The electrode in shroud 29 has the same shape, in other words, has a diameter at least as great as the width of the bottom of the slab, and the arc therefrom can rotate at the same speed.

The electrodes in shrouds 41 and 42 have diameters substantially corresponding to the height of the sides of the slab, or slightly greater, and the arcs therefrom can rotate at the same speed in accordance with the current in the arc and the strength in the magnetic field. Formulas for calculating the speed of the arc from the field strength and the arc current are set forth in the aforementioned copending patent application of A. M. Bruning. It will be readily seen that other factors may enter into the desired speed of travel of the slab, and the desired speed of rotation of the arc. For example, the depth to which the slab is to be heated is a factor; if it is desired to heat the slab to a greater depth, then the speed of movement of the slab can be slowed, the speed of rotation of the arcs can be increased, or the current in the arcs can be increased.

Formulas for relating the speed of the movement of the arc, speed of movement of the slab, arc current, and material, to the required heat flux for melting the slab to a predetermined depth will be set forth more fully hereinafter.

Roller 11 may also be driven by a motor, not shown.

Particular reference is made now to FIG. 2 where a second and preferred embodiment of apparatus for practicing our invention is shown. A slab generally designated 50, considerably wider than the slab 10 of FIG. 1, is shown as being moved by rollers 161 to 165 at one end thereof, and rollers 166 and 167 at the other end thereof, between two electrode assemblies 61 and 62. In the electrode assembly 61 an upper shroud 69 has electrodes 71, 72, 73, 74, 75 and 76 disposed therein having leads 51, 52, 53, 54, 55 and 56 respectively, and having dimensions approximately as shown. A lower shroud 70, it will be understood, has the same number of electrodes of similar dimensions spaced in the same manner positioned therein, with means not shown for convenience of illustration, for bringing electrical current to the electrodes to produce arcs from the electrodes to the bottom of slab 50. Pipes 79 and 80 bring an inert gas to the shroud 69, the gas being exhausted or freed in the area adjacent the arcing surface of the slab. The shrouds 69 and 70 have fluid spray pipes or manifolds 81 and 82 respectively on the exit sides thereof for spraying the upper and lower surfaces of the slab with a cooling fluid. It will be understood that pipes, not shown for convenience of illustration, also bring an inert gas to the electrodes of the lower shroud 70, this gas also being freed near the arcing surface of the slab.

Rollers 161—167 move the slab; roller 167 is shown as being driven by motor 168. Roller 161 may also be driven by a motor, not shown for convenience of illustration.

It will be understood that if desired additional rollers, not shown for convenience of illustration, may be disposed between electrode assembly 61 and electrode assembly 62.

It is seen in FIG. 2 that any portion of the slab 50 after moving past the area adjacent the fluid cooling pipes 81 and 82 moves adjacent the aforementioned second electrode assembly 62, which has shrouds 85 and 86 disposed adjacent the sides of the slab 50, each of the shrouds containing a pair of electrodes, the electrodes of shroud 86 being shown at 77 and 78 with leads 57 and 58 respectively. Disposed adjacent the exit sides of the shrouds 85 and 86 are a pair of fluid spray pipes or manifolds 89 and 90 for spraying the sides of the slab with a cooling fluid after any given portion of the slab has past through the heating area of the shrouds. It will be understood that the shroud 85 has a pair of electrodes, not shown for convenience of illustration, similar to electrodes 77 and 78, and shroud 85 has means, not shown, for bringing potentials to the electrodes therein to form arcs to the side surface of the slab 50. It will further be understood that both shrouds 85 and 86 have pipes or other means, not shown for convenience of illustration, for bringing an inert gas into the shroud and releasing the gas at the area or areas where the arcs take place to the surface of the slab or bloom.

Figure 3A:
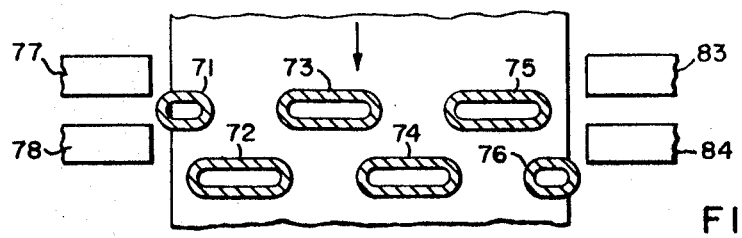
FIGS. 3A and 3B are views of the electrode arrangement of FIG. 2.

Particular reference is made now to FIG. 3A, which is a composite view in which the upper electrodes of assembly 61 are shown in cross section, and the electrodes of both shrouds 85 and 86 of the second electrode assembly 62 are shown generally in plan. The purpose of the composite view of FIG. 3A is to more clearly illustrate that the six electrodes 71 to 76 are so disposed that any point on the top surface of the slab passes through the arc of at least one of the six electrodes as the slab 50 moves with respect to the electrode assembly and the arcs rotate. The electrodes of the assembly 62 are seen as spaced along the path of movement, the electrodes of shroud 86 being shown at 77 and 78, and in FIG. 3A electrodes 83 and 84 of shroud 85 are also shown.

Figure 3B:
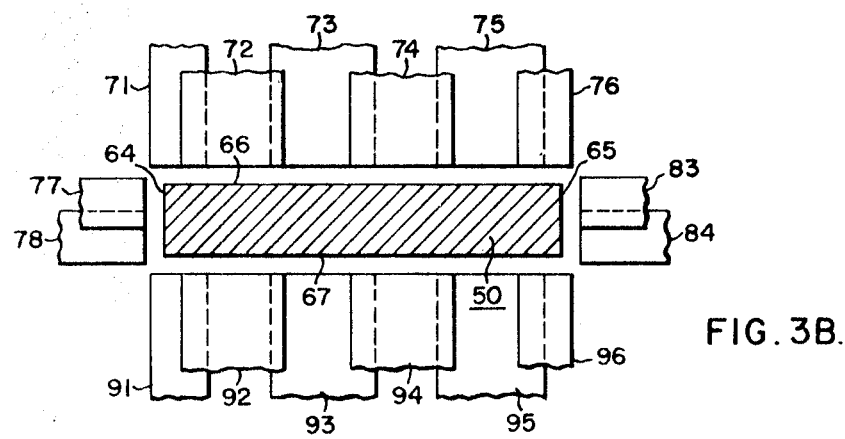

In FIG. 3B, to which particular attention is directed, the slab 50 is shown in relationship to all of the electrodes of both electrode assemblies 61 and 62. In FIG. 3B, the aforementioned electrodes on the bottom shroud 70 are shown at 91 to 96 inclusive. From FIG. 3B, it is seen that the side electrodes 77 and 78 overlap each other in a vertical direction, so that no portion of the side 64 of the slab can pass without having an arc traverse thereover, and electrodes 83 and 84 of shroud 85 are so placed that no portion of the side 65 of the slab can pass the electrodes without having the arc traverse the area of that portion of the side of the slab. In a like manner the aforementioned electrodes 71 to 76 are as aforementioned so placed with overlapping paths of arc movement that the top 66 of the slab has every spot thereon traversed by an arc, depending upon aforementioned factors of speed of rotation of the arcs, and the speed of movement of the slab. In like manner the bottom 67 of the slab has every point thereon subject to contact with the arcs from one of the aforementioned electrodes 91 to 96.

The apparatus of FIG. 2, by providing six arcs to cover or care for the entire upper and lower surfaces of the slab 50, permits a proportionally larger or more frequent contact of the arc with any given area of the slab, and more heat can be obtained in this fashion for treating a wider slab, or treating a given slab to a greater depth, or melting the surface of the slab in a shorter time.

Particular reference is made now to FIG. 4 wherein an electrical circuit according to a third embodiment of the invention is shown. In the apparatus of FIG. 4 two electrodes 101 and 102 produce arcs 103 and 104 respectively to the top surface of a slab generally designated 100. At the sides of the slab 100 one electrode has a sufficiently large diameter to cover an entire side, one of these side electrodes being shown at 105, producing an arc 106, the other electrode being shown at 107 producing an arc 108. At the bottom of the slab electrodes 109 and 110 produce arcs 111 and 112 respectively.

In FIG. 4 the six electrodes 101, 102, 105, 107, 109 and 110 are connected to a three phase source of supply. A three phase transformer has its primaries 117, 118 and 119 Y-connected with the junction between primaries connected to ground 120, and leads 114, 115, 116 connected to a suitable source of three phase alternating current potential. Secondaries 121, 122 and 123 are also Y-connected with the junction grounded at 120, and it is seen that the slab 100 is also electrically connected to ground 120. Secondary 121 is connected by way of lead 125 and inductor 126 to the aforementioned electrode 105, and lead 125 is also connected by way of inductor 127 to the aforementioned electrode 109. The aforementioned secondary 122 is connected by lead 128 and inductor 129 to electrode 107, and lead 128 is also connected by inductor 130 to electrode 110. The aforementioned secondary 123 is connected by lead 131 and inductor 132 to electrode 101, and the lead 131 is also connected by way of inductor 133 to electrode 102 completing the electrical circuit for forming the six arcs to the slab 100.

Particular reference is made now to FIGS. 5A and 5B. In FIG. 5A two pairs of electrodes A and B are shown connected across a single secondary, by way of a choke or inductor D which carries the current of both arcs. Let it be assumed for purposes of illustration that secondary C supplies 2,000 volts and that it requires a voltage of 1,000 volts to start an arc at electrodes, B. Assume further that an arc is taking place at the pair of electrodes A. The voltage drop across the electrodes A is the same as that across electrodes B and is so small that the necessary voltage will never be built up across the electrode B to cause an arc to start. Assume now that circuit is connected as shown in FIG. 5B, in which electrodes A and B have individual inductors or choke coils E and F connecting them to the secondary C. If the arc starts at A before it does at B, even though a voltage, for example, only 500 volts exists across the arc A, an additional voltage drop of 1,500 volts may exist across the series-connected choke. This is on the assumption that secondary C supplies a voltage of 2,000 volts. Since no current is flowing in the choke or inductor F, no voltage drop occurs thereacross, and the entire 2,000 volts is developed across the pair of electrodes B sufficient to start the arc. Such an arrangement of an individual inductor in series with each pair of electrodes is accordingly desirable and possibly necessary when two pairs of electrodes are fed from the same phase of a three-phase alternating current source, such for example as used in the circuit of FIG. 4.

If desired, ground 120 may be omitted from both transformer and slab, with the slab providing a conductive neutral current path between phases.

The secondaries could also be Delta connected, without requiring any electrical connection to the slab.

Particular reference is made now to FIG. 7, where the graphs illustrate the relationship between the average temperature of the slab or bloom, and the depth to which the slab is heated beneath the surface for a number different "dwell times" or heating times or passage times, it being assumed that the power in the arcs remains substantially constant.

The family of curves of FIG. 7 shows the different temperatures to which the slab is heated at any given depth as the time employed to melt the surface of the slab to a depth of 0.1 inch is varied. Assuming for the purposes of discussion an initial slab temperature of 2,400° F, and that the slab melts at 2,700° F, if the time used to melt the surface of the slab to a depth of 0.1 inch is one second, it is seen from the curves that a point in the slab 0.5 inch from the surface or 0.5 inch deep is heated to 2,410°, whereas in three seconds the same point 0.5 inch deep is heated to 2,460°.

The temperature of the point, and those of other points of other depths, can also be obtained for other heating times from the curves.

Since the longer the time required to melt to 0.1 inch, for any given depth in the slab, the greater the temperature the slab at that depth is heated to, it is apparent that additional heat energy is required at the slower speed. From the curves of FIG. 7 it is seen that the integrated area under the three second curve is greater than the integrated area under the one second curve. This integrated area represents heat used in heating the slab in addition to the heat required to melt the surface to a depth of 0.1 inch. Since heat energy used in heating the core of the slab serves no useful purpose, it is seen that the longer time of 3 seconds represents decreased efficiency.

From the one-second curve, it is seen that after a period of one second the temperature distribution in the remainder of the slab is such that at a depth of approximately 0.025 inch from the surface, the metal temperature has risen to 2,500° F.

The curves of FIG. 7 are useful in calculating the additional heat required to balance loss to the core of the slab in the following somewhat simplified calculations of an exemplary condition which might be met in practice, where a slab size of $6' \times 1'$ is assumed, an initial slab temperature of 2,400° F is assumed, and it is assumed that the material of the slab melts at 2,700° F.:

Specific heat required to raise the metal temperature from 2,400°F to 2,700°F. $= .11 \frac{\text{B.t.u.}}{\text{lb.°F.}} \times 300°\text{F.} = 33 \frac{\text{B.t.u.}}{\text{lb.}}$ Heat of fusion to melt metal at 2,700°F. $= 117 \frac{\text{B.t.u.}}{\text{lb.}}$ Assume melting to a depth of 0.1 inch: (and a metal weight of 0.284 lbs./in.³) $0.1 \text{ in.} \times \frac{144 \text{ in.}^2}{\text{ft.}^2} \times .284 \frac{\text{lb.}}{\text{in.}^3}$
$= 4.1 \frac{\text{lbs.}}{\text{ft.}^2}$ The heat flux required for melting is:
$117 \times 4.1 = 480 \frac{\text{B.t.u.}}{\text{ft.}^2}$ $33 \times 4.1 = 135 \frac{\text{B.t.u.}}{\text{ft.}^2}$ $\text{Total} = 615 \frac{\text{B.t.u.}}{\text{ft.}^2}$ The additional heat required to balance loss to core of slab, where "q" is the energy per unit area, obtained from the curve of FIG. 7 by integrating the area under the curve:

$q \text{ 1 sec.} = 192 \frac{\text{B.t.u.}}{\text{ft.}^2}$  $\qquad q \text{ 3 sec.} = 338 \frac{\text{B.t.u.}}{\text{ft.}^2}$ $q \text{ melt} = 615 \frac{\text{B.t.u.}}{\text{ft.}^2}$ $\qquad q \text{ melt} = 615 \frac{\text{B.t.u.}}{\text{ft.}^2}$ $\text{Total} = 807 \frac{\text{B.t.u.}}{\text{ft.}^2}$ $\qquad \text{Total} = 953 \frac{\text{B.t.u.}}{\text{ft.}^2}$ For the slab, size $6' \times 1'$ (1 sec.) $807 \frac{\text{B.t.u.}}{\text{ft.}^2} \times 14 \frac{\text{ft.}^2}{\text{ft.}} = 11,300 \frac{\text{B.t.u.}}{\text{ft.}}$ (linear)

(3 sec.) $953 \frac{\text{B.t.u.}}{\text{ft.}^2} \times 14 \frac{\text{ft.}^2}{\text{ft.}} = 13,340 \frac{\text{B.t.u.}}{\text{ft.}}$ (linear)

From power equivalent tables such as those found in a handbook for electrical engineers, it is found that one B.T.U. is approximately the equivalent of 1 kilowatt. Assuming slab speeds of 100 feet per minute and 33.3 feet per minute, by way of examples: Power into slab:

$11,300 \frac{\text{B.t.u.}}{\text{ft.}} \times 100 \frac{\text{ft.}}{\text{min.}}$
$= 1.13 \times 10^6 \frac{\text{B.t.u.}}{\text{min.}} = 19.8 \text{ megawatts}$ $13,340 \frac{\text{B.t.u.}}{\text{ft.}} \times 33.3 \frac{\text{ft.}}{\text{min.}}$
$= 0.444 \times 10^6 \frac{\text{B.t.u.}}{\text{min.}} = 7.8 \text{ megawatts}.$ Assuming an efficiency of 50 percent, the powers required are 39.6 megawatts and 15.6 megawatts.

Assuming use factors of 20 percent and 40 percent for the 100 ft./min. and 33.3 ft./min. speeds:

$39.6 \text{ m.w.} \times .2 \frac{\text{hr.}}{\text{hr.}} = 7.92 \frac{\text{megawatt hours.}}{\text{hr.}}$ $15.6 \text{ m.w.} \times .4 \frac{\text{hr.}}{\text{hr.}} = 6.24 \frac{\text{megawatt hours.}}{\text{hr.}}$ Particular reference is made now to FIG. 6, where a fourth embodiment of the invention is shown which is particularly suitable for use where difficulty is encountered, and melting the bottom surface of the bloom or slab results in loss of molten metal before it can be solidified. In the embodiment of FIG. 6, the top and one side of the slab 140 are treated as the slab moves in one direction, for example, from right to left in the figure. The slab thereafter passes into apparatus which may be of conventional design and which is shown in block form at 141 for turning the slab over, and the slab is thereafter passed again past the electrodes where the other wide surface and the other side are treated as the slab moves in the opposite direction, for example, from left to right in the figure. For the purposes of describing the embodiment of FIG. 6, the top surface of the slab is designated 142, and the side surface first treated is designated 143. The shroud 145 has a plurality of energized, not shown for convenience of illustration, disposed therein, with pipes 146 and 147 for bringing an inert or reducing gas to the arcing surface of the slab. It is seen that shroud 145 has two spray pipes or manifolds on the two sides thereof, these being shown at 148 and 149, each of the spray pipes having a valve therein, the valve for pipe 149 being shown at 150. As the slab 140 is moving in the left-hand direction, the valve in pipe 148 is opened so that spray coming out of the spray pipe or manifold 148 cools successive portions of the slab surface which have passed adjacent the electrodes within the shroud 145. On the other hand, after the slab has been turned over in apparatus 141, the valve in pipe 148 is turned off, and the valve 150 to manifold 149 is opened so that spray pipe or manifold 149 sprays the upper or adjacent surface of the slab after said last-named surface passes adjacent the electrodes within the shroud. It will be understood that the lower housing 152 contains no electrodes in the embodiment of FIG. 6. The lower housing 152 may if desired be replaced by rollers so that an unbroken series of rollers supports the slab 140. As previously stated some of the rollers are free to rotate, while other rollers are driven, the driven rollers being disposed at spaced intervals along the length of the slab, two driven rollers being designated 170 and 171 with reversible drive motors 172 and 173 respectively.

The electrode or electrodes for treating the side 143 of the slab, as the slab moves from a right to left direction are disposed within the shroud 155, which has spray pipes 156 and 157 disposed on the sides thereof, respectively, it being understood that the spray pipes or manifolds 156 and 157 have valves, not shown, individual thereto so that successive portions of the surface of the side of the slab can be sprayed with a cooling fluid substantially immediately after they leave the electrode area, depending upon which direction the slab is moving. It will further be understood that the housing 159 contains no electrode in the embodiment of FIG. 6. Means, not shown, is provided for bringing an inert gas into the shroud 155 and permitting the inert gas to escape near the arcing surface of the slab.

Particular reference is made now to FIG. 8, where a simplified cylindrical nonconsumable electrode 199 is shown, partially in elevation and partially in cross section, the details of the nonconsumable electrode constituting no part of the present invention, the annular arcing surface being shown at 200, the field coil at 201.

In FIG. 1, the upper and lower electrodes may be connected to opposite terminals of a source of potential, the slab providing a neutral current path between the electrodes. In like manner, the side electrodes may be connected to terminals of opposite polarity of a source, the slab being neutral but providing a current path between electrodes.

There have been provided then a number of embodiments of apparatus suitable for practicing the method of our invention, which is to pass the surfaces of a slab or bloom past an arc or arcs where the surfaces are simultaneously or sequentially heated to a predetermined depth to remove defects therefrom, and the surfaces are promptly cooled after the heat treatment thereof by the arcs.

The term "inert gas" as employed in the claims appended hereto includes reducing gases and nonoxidizing gases.

The term "slab" as used in the claims appended hereto includes blooms of irregular shapes.

Whereas we have shown and described apparatus for practicing the method of our invention according to a number of embodiments thereof it will be understood that changes may be made and equivalents substituted without departing from the spirit and scope of the invention.

We claim:

1. A method of heat treating a slab of metal to remove defects therefrom which comprises the steps of forming at least one electric arc from an annular electrode extending to the slab in a path substantially perpendicular to a surface of the slab, utilizing a magnetic field to cause the arc path to describe substantially annular repetitive rotative movements about a substantially unchanged axis while maintaining the arc path substantially perpendicular ro the surface of the slab, moving the slab in a substantially linear path at a predetermined speed, said linear path being substantially perpendicular to the arc path whereby successive rotations of the arc spot on the slab as the arc rotates are displaced from each other by an amount which is a function of the rate of arc movement and a function of the rate of slab movement, the rates of movement being chosen with respect to each other whereby at least a substantially rectangular portion of the slab surface is substantially uniformly heated by the arc spot directly thereon.

2. A method according to claim 1 including the additional step of quickly cooling successive portions of said slab surface after said portions have been heated by the electric arc.

3. A method according to claim 1 wherein the substantially annular repetitive rotative movements of the arc describe an ellipse.

4. A method according to claim 1 wherein the substantially annular repetitive rotative movements of the arc extend transversely across substantially the entire slab surface and in which said rectangular portion of the slab surface encompasses substantially the entire surface.

5. A method according to claim 1 in which at least two arcs to the slab surface are formed, the repetitive movement of one arc being displaced from the repetitive movement of the other arc laterally across the slab surface, the rotations of the arc spot of one arc on the slab surface overlapping the rotations of the arc spot of the other arc on the slab surface as said slab moves in said linear path.

6. A method for removing defects from a slab of metal having at least one substantially flat surface comprising the steps of moving the slab in a predetermined linear path at a predetermined speed, mounting an annular electrode at a predetermined position along the path of travel of the slab having an annular fluid-cooled arcing surface and with the arcing surface of the electrode spaced from and substantially parallel to the adjacent flat surface of the slab, creating a potential difference between the electrode and the slab whereby an arc is formed between the slab and the arcing surface of the electrode, said arc extending in a direction substantially parallel to the axis of the electrode and substantially perpendicular to said flat surface of the slab, generating a magnetic field within the electrode with at least a strong component extending substantially radially in a transverse direction across the arcing surface and exerting a force on the arc which causes the arc between electrode and slab surface to move in substantially repetitive annular paths on the arcing surface and to take similar repetitive arc paths on the slab surface as the slab moves, which last-named paths extend a predetermined portion or all of the transverse distance across the slab surface, the arc paths on the slab surface being displaced from each other a distance which is a function of the speed of arc rotation and a function of the speed of slab movement, the rate of movement of the slab and the rate of movement of the arc being selected with respect to each other whereby substantially every point on the slab surface within said transverse distance has an arc spot thereto as the slab moves in said linear path with a resulting increase in heating efficiency and more uniform heating of the slab to a substantially constant depth beneath the slab surface.

7. A method for removing defects from a slab of metal having at least three substantially flat surfaces comprising the steps of moving the slab in a predetermined linear path at a predetermined speed, mounting at least three annular electrodes at predetermined positions along the path of travel of the slab, each electrode having an annular fluid-cooled arcing surface and with the arcing surface of each electrode spaced from and substantially parallel to an adjacent and different flat surface of the slab, creating potential differences between all of the electrodes and the slab whereby arcs are formed between the slab and the arcing surfaces of all of the electrodes, each arc extending in a direction substantially parallel to the axis of the electrode to which it takes place and substantially perpendicular to the flat slab surface to which it takes place, generating a magnetic field within each electrode with at least a strong component extending substantially radially in a transverse direction across the arcing surface of the electrode and exerting a force on the arc from the electrode which causes the arc to move in substantially repetitive annular paths on the arcing surface of the electrode and to take similar repetitive arc paths on the adjacent slab surface to which the arc takes place as the slab moves, each repetitive arc path on a slab surface extending a predetermined portion or all of the transverse distance across the last-named slab surface, the repetitive arc paths on a slab surface being displaced from each other a distance which is a function of the speed of arc rotation and a function of the speed of slab movement, the rates of movement of the arcs and the rate of movement of the slab being selected with respect to each other whereby substantially every point on each slab surface within the transverse distance covered by the arc path on that surface has an arc spot thereto as the slab moves in said linear path with resulting increases in heating efficiency and more uniform heating of the slab to substantially constant depths beneath all of the slab surfaces.

8. The method of heat treating a substantially rectangular slab of metal to remove defects therefrom which comprises the steps of moving the slab in a first direction along a predetermined path, mounting at least two annular electrodes at predetermined positions along the path of travel of the slab, each electrode having an annular fluid-cooled arcing surface and with the arcing surface of each electrode spaced from and substantially parallel to an adjacent and different flat surface of the slab, the two electrodes being so mounted with respect to each other that their arcing surfaces are substantially parallel respectively to two slab surfaces which make substantially a 90° angle with respect to each other, creating potential differences between both of the two electrodes and the slab whereby arcs are formed between the slab and the arcing surfaces of both of the electrodes, each arc extending in a direction substantially parallel to the axis of the electrode to which it takes place and substantially perpendicular to the flat slab surface to which it takes place, generating a magnetic field within each electrode with at least a strong component extending substantially radially in a transverse direction across the arcing surface of the electrode and exerting a force on the arc form the electrode which causes the arc to move in substantially repetitive annular paths on the arcing surface of the electrode and to take similar repetitive arc paths on the adjacent slab surface to which the arc takes place as the slab moves, each repetitive arc path on a slab surface extending a predetermined portion or all of the transverse distance across the last-named slab surface, the arc paths on a slab surface being displaced from each other a distance which is a function of the speed of arc rotation and a function of the speed of slab movement, the rates of movement of the arcs and the rate of movement of the slab being selected with respect to each other whereby substantially every point on the slab surfaces within the transverse distances of arc movement has an arc spot thereto as the slab moves in said first direction with a resulting increase in heating efficiency and more uniform heating of the slab to a substantially constant depth beneath the slab surface, turning the slab over whereby the two surfaces thereof not previously having arcs thereto are each adjacent the arcing surface of one of the two electrodes, and causing the slab to move in the opposite direction at a predetermined speed while maintaining arcs to said last-named two surfaces which move at predetermined speeds selected in accordance with the last-named speed of slab movement so that arc spots occur on the two last-named slab surfaces at substantially every point thereon within the lateral distances of movement of the arcs.

9. The method according to claim 8 including the additional step of quickly cooling the upper and lower surfaces and both the side surfaces after the respective surfaces are heated by the arcs.

10. A method of heat treating a slab of metal to remove defects therefrom comprising the steps of forming an electric arc from a fluid-cooled annular electrode arcing surface to at least one surface of the slab, generating a magnetic field which causes the arc to move substantially continuously in repetitive generally annular paths over the arcing surface, moving the slab along a predetermined path past the electrode while causing the arc to periodically traverse a recurring generally annular path along a strip of the surface of the slab, the speed of arc movement and the speed of slab movement being selected with respect to each other whereby an arc spot occurs at substantially every point on said surface within the dimensions of said strip with increased heating efficiency and more uniformity in the depth to which the slab is heated to a predetermined temperature, and quickly cooling successive portions of the surface of the slab after said portions have been heated by the electric arc.

11. A method of heat treating a multisurface slab of metal to remove defects therefrom which comprises the steps of forming an electric arc from a fluid-cooled annular electrode to at least one surface of the slab, generating a magnetic field which causes the arc to move substantially continuously in generally repetitive paths over the arcing surface, moving the slab along a predetermined path past the electrode whereby the moving arc describes paths on the slab surface similar to the paths on the arcing surface of the electrode, the speed of movement of the slab and the speed of movement of the arc being selected with respect to each other whereby substantially every point within the lateral dimension of the arc paths on the slab surface has an arc spot formed thereon with improved heating efficiency and more uniform heating of the slab, providing an inert gas atmosphere at the instant portion of the slab surface being melted as the slab moves in said path, and quickly cooling successive portions of said slab surface after said portions have been heated by the electric arc.